United States Patent
Hall et al.

(10) Patent No.: US 9,919,589 B1
(45) Date of Patent: Mar. 20, 2018

(54) REMOVABLE GULL-WING ROOF RACK

(71) Applicants: David R. Hall, Provo, UT (US); Stephen R. Hall, Draper, UT (US); Christopher Johnson, Bluffdale, UT (US); Jason Simpson, Washington, MI (US)

(72) Inventors: David R. Hall, Provo, UT (US); Stephen R. Hall, Draper, UT (US); Christopher Johnson, Bluffdale, UT (US); Jason Simpson, Washington, MI (US)

( * ) Notice: Subject to any disclaimer, the term of this patent is extended or adjusted under 35 U.S.C. 154(b) by 0 days.

(21) Appl. No.: 15/472,028

(22) Filed: Mar. 28, 2017

(51) Int. Cl.
*B60J 7/10* (2006.01)
*B60J 7/11* (2006.01)

(52) U.S. Cl.
CPC ...... *B60J 7/106* (2013.01); *B60J 7/11* (2013.01)

(58) Field of Classification Search
CPC .................................... B60J 7/106; B60J 7/11
USPC .................. 296/102, 218, 103; 280/756
See application file for complete search history.

(56) References Cited

U.S. PATENT DOCUMENTS

| | | | | |
|---|---|---|---|---|
| 4,440,436 A | * | 4/1984 | Giddens | B60J 7/1278 135/141 |
| 4,632,448 A | * | 12/1986 | Yagasaki | B60J 7/08 296/102 |
| 5,538,309 A | * | 7/1996 | Murray | B60J 5/0473 296/146.9 |
| 6,824,192 B2 | * | 11/2004 | Hoffmann | B60J 7/10 296/100.18 |
| 8,398,160 B2 | * | 3/2013 | Baumann | B60J 7/11 296/187.13 |
| 8,794,692 B1 | * | 8/2014 | Burke | B60J 5/0487 280/756 |
| 9,422,020 B2 | * | 8/2016 | Kim | B62J 17/08 |
| 2008/0265609 A1 | * | 10/2008 | Orrell | B60J 1/04 296/107.07 |

FOREIGN PATENT DOCUMENTS

GB         427454 A * 4/1935 ............. B60J 7/106

\* cited by examiner

*Primary Examiner* — Dennis H Pedder

(57) ABSTRACT

A detachable vehicle roof is described herein. Various embodiments may include overhead covers, hinges, and a frame. The overhead covers may cover a vehicle passenger compartment. The hinges may connect the overhead covers to the frame. The frame may be detachable from a vehicle chassis. The frame may include a rear support bar, cross-bars, and a front support bar. The cross-bars may connect the front support bar to the rear support bar. The front support bar may form a contour of an edge of a vehicle windshield. The front support bar may form a contour of an edge of a vehicle chassis. The contour may have a bend corresponding to a position on the chassis where the windshield mounts to the chassis. A buffer zone may be provided between the front support bar and the windshield, and/or between the front support bar and the chassis.

16 Claims, 10 Drawing Sheets

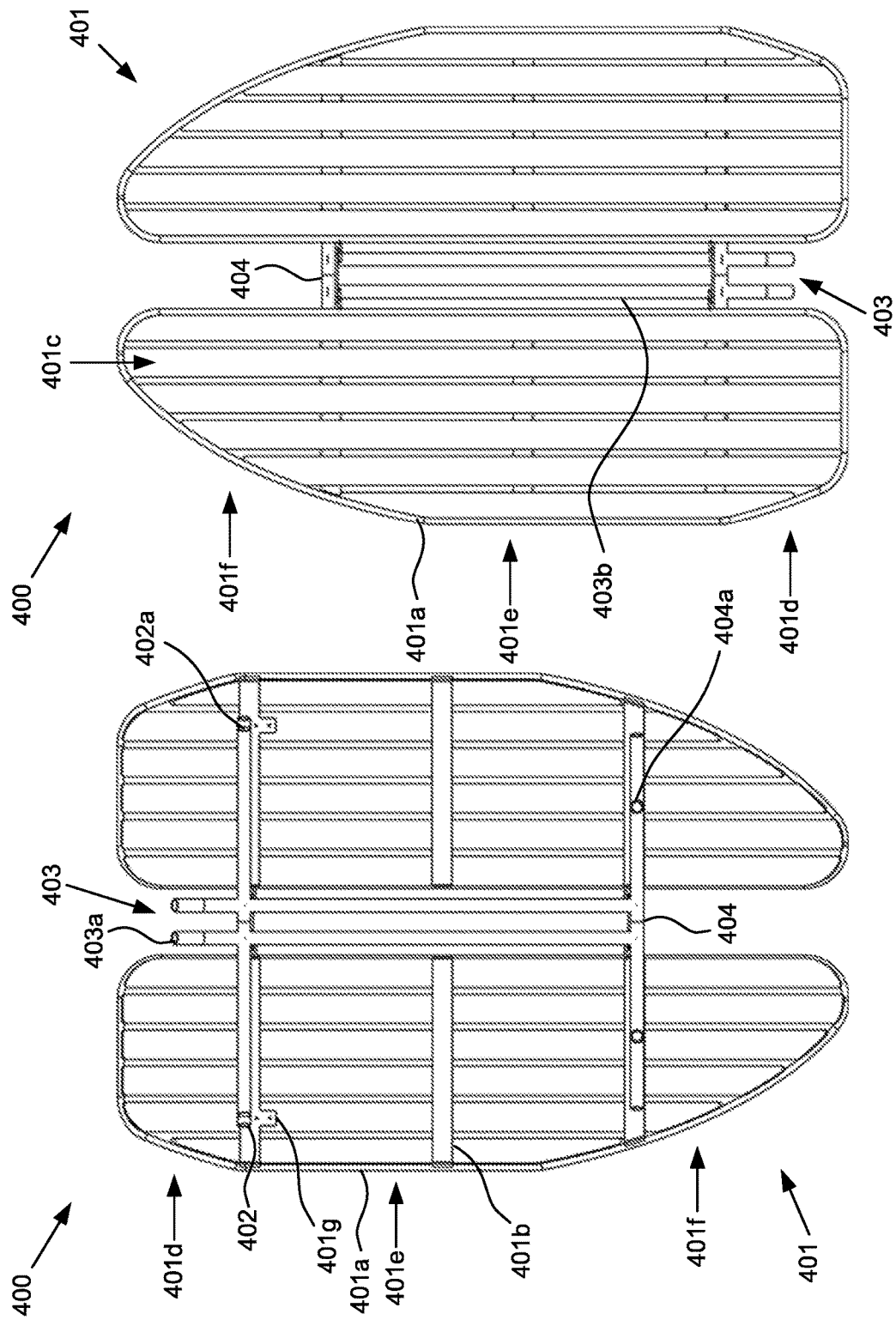

REMOVABLE GULL-WING ROOF RACK

TECHNICAL FIELD

This invention relates generally to the field of automobiles, and more specifically to removable roofs and covers for automobiles.

BACKGROUND

Three-wheeled roadsters have recently been growing in popularity with recreational vehicle consumers. Such popularity has increased the demand for a variety of design features, and greater affordability, to meet the tastes and needs of different types of consumers. One cost-saving technique employed has been to manufacture such vehicles without doors and tops, and to install non-framed windshields. This saves on materials and simplifies the design of the vehicles, thus reducing cost. However, some consumers may still prefer doors and tops that shield passengers in the vehicle from environmental and road conditions. As a solution, many after-market parts have been manufactured and installed. Despite these solutions, there is still room for improvement to the functionality and design of removable tops for recreational vehicles.

SUMMARY OF THE INVENTION

A detachable vehicle roof is described herein that addresses at least some of the problems described above in the Background and improves upon previous solutions. Various embodiments may include one or more overhead covers, one or more hinges, and a frame. The one or more overhead covers may correspond to a vehicle passenger compartment. The one or more hinges may be connected to at least one of the one or more overhead covers, the frame, or both. The frame may be detachable from a portion of a vehicle chassis, such as a portion that forms the passenger compartment. The frame may be connected to at least one of the one or more hinges. The frame may include a rear support bar, one or more cross-bars, and a front support bar. The rear support bar may be aligned transversely with the chassis. At least one of the one or more cross-bars may be aligned longitudinally with the chassis. The front support bar may be aligned at least partially transversely with the chassis. At least one of the one or more cross-bars may connect the front support bar to the rear support bar. The one or more cross-bars may be connected to the front support bar less than or equal to six inches from a center of the front support bar. The one or more cross-bars may be connected to the rear support bar less than or equal to six inches from a center of the rear support bar. The one or more cross-bars may be connected to the front support bar and the rear support bar less than or equal to six inches from the respective centers. The front support bar may form a contour of an edge of a vehicle windshield. The front support bar may form a contour of an edge of a vehicle chassis. The contour may have a bend corresponding to a position on the chassis where the windshield mounts to the chassis. A buffer zone may be provided between the front support bar and the windshield, and/or between the front support bar and the chassis. The buffer zone may have a width ranging from ¼-inch to six inches. The buffer zone may provide empty space between the front support bar and the windshield and/or chassis to prevent structural damage to each that may be caused by vibrations during operation of the vehicle.

BRIEF DESCRIPTION OF THE DRAWINGS

A more particular description of the detachable roof summarized above is made below by reference to specific embodiments. Several embodiments are depicted in drawings included with this application, in which:

FIGS. 4A-C depict views of a portion of a detachable roof;

DETAILED DESCRIPTION

Figure 1A:
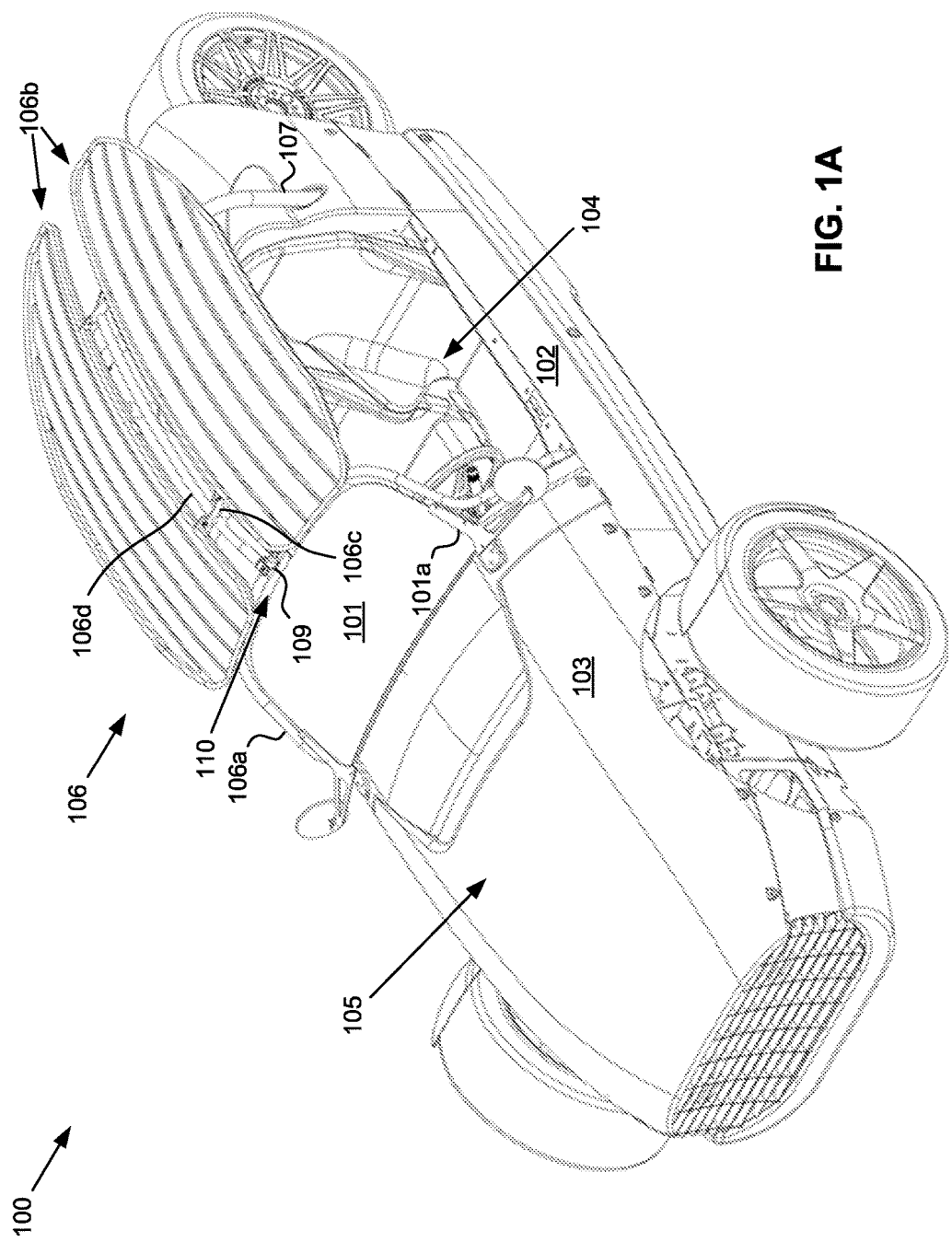
FIGS. 1A-B depict views of a three-wheeled vehicle with a detachable roof.

A detailed description of embodiments of a detachable vehicle roof is provided below by example, with reference to embodiments in the appended figures. Those of skill in the art will recognize that the components as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the appended claims are also envisioned, as is recognized by those of skill in the art.

A detachable vehicle roof is described herein. Various embodiments may include one or more overhead covers, one or more hinges, and a frame. The one or more overhead covers may correspond to a vehicle passenger compartment. The one or more hinges may be connected to at least one of the one or more overhead covers, the frame, or both. The frame may be detachable from a portion of a vehicle chassis, such as a portion that forms the passenger compartment. The frame may be connected to at least one of the one or more hinges. The frame may include a rear support bar, one or more cross-bars, and a front support bar. The rear support bar may be aligned transversely with the chassis. At least one of the one or more cross-bars may be aligned longitudinally with the chassis. The front support bar may be aligned at least partially transversely with the chassis. At least one of the one or more cross-bars may connect the front support bar to the rear support bar. The one or more cross-bars may be connected to the front support bar within a range of lengths from a center of the front support bar. The one or more cross-bars may be connected to the rear support within a range of lengths from a center of the rear support bar. The one or more cross-bars may be connected to the front support bar and the rear support bar within a range of lengths from the respective centers. The range of lengths may include less than or equal to six inches, less than or equal to twelve inches, six to twelve inches, ten to twelve inches, seven to nine inches, five to eight inches, and/or one to four inches. The front support bar may form a contour of an edge of a vehicle windshield. The front support bar may form a contour of an edge of a vehicle chassis. The contour may have a bend corresponding to a position on the chassis where the windshield mounts to the chassis. A buffer zone may be provided between the front support bar and the windshield, between the front support bar and the chassis, or both. The buffer zone may have a width ranging from ¼-inch to six inches, one inch to five inches, three inches to eight inches, and/or two inches to four inches. The buffer zone may provide empty space between the front support bar and the windshield and/or chassis to prevent structural damage to each that may be caused by vibrations during operation of the vehicle.

Various types of vehicles may include the components described herein. One such vehicle includes a three-wheeled roadster, various views and embodiments of which are depicted in the FIGs. Despite this, those of skill in the art recognize the general applicability of the components described herein to a variety of vehicles. Thus, as used herein, "vehicle" may refer, generally, to any of a variety of inanimate passenger or cargo carriers, including landcraft, watercraft, aircraft, and combinations thereof. Examples include automobiles, all-terrain vehicles, amphibious vehicles, buses, trucks, cars, rickshaws, bicycles, motorcycles, cable cars, sleds, golf carts, drones, handcars, hovercraft, land yachts, locomotives, maglevs, minibuses, minivans, monorails, monowheels, mopeds, omni directional vehicles, quadracycles, rocket sleds, rovers, sea tractors, ground effect vehicles, boats, ships, catamarans, canoes, hydrofoils, jet skis, kayaks, ferries, airplanes, helicopters, autogyros, balloons, gliders, ornithopters, pedalos, powered parachutes, and rockets, among others.

The vehicle may include any of a variety of mechanisms for travelling across and/or through surfaces, such as wheels, skis, skids, hulls, and airfoils. In wheeled embodiments, the vehicle may include any of a variety of drive trains, including front-wheel drive, rear-wheel drive, three-wheel drive, four-wheel drive, or combinations thereof. For example, the vehicle may incorporate electronics that switch the drive train between front-wheel drive and three-wheel drive, or between rear-wheel drive and four-wheel drive. The vehicle may include any of a variety of mechanisms for accessing the vehicle, such as doors, windows, hatches, and permanent openings. In various embodiments, the vehicle may include a chassis on which various vehicle components are mounted. The vehicle may also, in some embodiments, include components such as body panels, an engine or motor, a transmission, an electrical system, one or more batteries, a heating and/or cooling system, navigational systems, and a fuel system, among others. Various vehicle components may be comprised of any of a variety of materials and material combinations, such as metal, plastic, rubber, leather, glass and composites.

The chassis may include any of a variety of base structures for the vehicle, including a ladder frame, a unibody frame, a backbone tube frame, an X-frame, a perimeter frame a platform frame, a space frame, a vehicle subframe, or combinations thereof. The chassis may be formed of any of a variety of materials, including aluminum, steel, carbon, other metal alloys, and/or combinations thereof. The chassis may incorporate various rail designs, such as c-shape, hat, boxed, tubular, planar, and/or combinations thereof. The chassis may include space for various segments of the vehicle, including a passenger and/or cargo compartment and an engine cradle.

The chassis may include one or more openings within which the roof frame may be mounted. The openings may correspond to the front support bar and/or the rear support bar such that the front and/or rear support bars may mount to the vehicle chassis. Similarly, the chassis may include one or more hollow shafts within which the roof frame may be mounted. The frame may be secured within the chassis. In such embodiments, the chassis may include one or more additional openings, separate from the openings and/or hollow shafts in which the roof frame mounts, to access the interior of the chassis and secure the roof frame to the chassis. For example, the chassis may include one or more speaker openings within which one or more speakers may be removably mounted to the chassis. The speakers may be removed to detach the roof frame from the chassis. Additionally or alternatively, the roof-frame openings and/or hollow shafts in the chassis may include one or more stops on which the roof frame may rest within the chassis.

The chassis may include at least one fixed partial wall along at least one side of the passenger compartment. The wall may have a height less than or equal to three-quarters a height of a portion of the chassis forming an engine compartment. The height differential may allow for simpler construction of the vehicle while still allowing simple and/or convenient access to the passenger compartment and while still providing some side protection to passengers within the passenger compartment. The openings and/or hollow shafts may be disposed in the wall, such that the roof frame mounts in the wall.

The passenger compartment may include various features for accommodating one or more passengers, such as seats. The passenger compartment may include various features for driving the vehicle, such as a steering wheel, a shifter, a gas and brake pedal. In general, the passenger compartment may comprise a volume within the chassis that accommodates the passengers. The chassis may enclose the passenger compartment on one or more sides. The passenger compartment may be exposed to an external environment along one or more sides. For example, the chassis may enclose the passenger compartment by a floorboard, a firewall, an instrument panel, two partial sidewalls, and a rear wall, and the passenger compartment may be exposed to an external environment along the sides and over the top of the passenger compartment. A windshield may further enclose the passenger compartment. The detachable roof may also further enclose the passenger compartment. In various embodiments, when the roof is attached to the vehicle, the passenger compartment may be enclosed overhead, and may be exposed to the external environment along the sides of the passenger compartment extending from the partial side walls to the roof. The passenger compartment may also be partially exposed to the external environment along a rear portion of the passenger compartment extending from the chassis to the roof. Interstices between the roof and the windshield and/or chassis may expose the passenger compartment to the external environment along the front of the passenger compartment.

The roof may cover various portions of the passenger compartment up to and including an entire overhead portion of the passenger compartment. The overhead portion of the passenger compartment may be characterized by a width extending from an imaginary plane extending parallel from an outside edge of the vehicle chassis forming the passenger compartment on one side of the vehicle to an imaginary plane extending parallel from an outside edge of the vehicle chassis forming the passenger compartment on the other side of the vehicle. The overhead portion of the passenger compartment may further be characterized by a length extending from an imaginary plane extending parallel from an inside wall of the vehicle chassis forming a front end of the passenger compartment to an imaginary plane extending parallel from an inside wall of the vehicle chassis forming a back end of the passenger compartment. The roof may be removable from the vehicle, or may be integral with the vehicle. As used herein, the terms "removable" and "detachable" may refer to a property of the corresponding component that indicates the manufacturer of the component and/or vehicle expected that the consumer of the vehicle would utilize the vehicle with the component both attached and detached. Similarly, "integral" may refer to a property of the corresponding component that indicates the manufacturer of the component and/or vehicle expected that the consumer of the vehicle would only utilize the vehicle with the component attached to the vehicle.

The roof may include means of articulation that allow the roof to move with respect to the vehicle while still being attached to the vehicle. Such means may include various hinges, joints, motors, pumps, and/or telescoping rods. Such movement may include folding inwards over the vehicle, similar to a gull-wing door. The roof may be transparent, opaque, partially transparent, intermittently transparent, or combinations thereof. The roof may be monolithic or segmented. The roof may provide complete overhead coverage of the passenger compartment, intermittent overhead coverage of the passenger compartment, partial overhead coverage of the passenger compartment, or combinations thereof.

The one or more overhead covers may comprise any of a variety of structures. In some embodiments, the overhead covers may include one or more rigid panels. The panels may be connected directly to the hinges, directly to one or more of the front support bar, at least one of the one or more cross-bars, the rear support bar, or combinations thereof, or may be framed and/or supported by one or more structures. The panels may be rigid enough to support their own weight without external support, may be flexible but still rigid enough to support their own weight, or may be flexible and require support, such as by tensioning the panel to a frame or providing support underneath the panel. In some embodiments, the overhead covers may include a plurality of rigid slats supported by a frame. In some embodiments, the overhead covers may include both panels and slats.

The overhead cover may include a subframe. The subframe may include a rod that forms a closed loop having an interior area. The closed-loop rod may be supported by one or more cross-beams extending across the interior area. The panel, the plurality of slats, or both, may be supported within the interior area by the cross-beams. At least one of the one or more cross-beams may rest on the front support bar, the rear support bar, or both. The hinge may be connected to one or more of the closed-loop rod and the cross-beams, and the front/rear support bar may prevent over-rotation of the hinge by gravity, or otherwise. In some embodiments, the one or more cross-beams may include one or more raised ends that raise the closed-loop rod above the one or more cross-beams. Such a configuration may form a luggage rack. The raised structure of the closed-loop rod over the cross-beams may form a basin within which articles may be placed for storage during travel. The basin may have openings along the closed-loop rod that may allow for clips and/or hooks to be attached to the closed-loop rod for securing articles during travel.

The overhead cover may include three segments. A first segment may include a forward-tapered width, wherein the width of the first segment narrows towards a front portion of the overhead cover. A second segment may include a uniform width along an entire length of the second segment. A third segment may include a rear-tapered width, wherein the width of the third segment narrows towards a rear portion of the overhead cover. Such a configuration may provide various aerodynamic benefits while maximizing coverage and travel storage capacity. The overhead cover may be comprised of any of a variety of materials, including plastic, metal, composites, and/or fabric.

The rear support bar may mount to the chassis, to one or more roll bars connected directly to the chassis, or both. The roll bars may be disposed behind the passenger compartment, within the passenger compartment at a rear end of the passenger compartment, or a combination thereof. The roll bars may extend above the chassis and the passenger compartment to protect passengers in the event of a roll-over accident. In some embodiments, the rear support bar may include one or more standoffs extending from, and below, the rear support bar. At least one of the standoffs may insert into one or more openings in at least one of the one or more roll bars. The standoff may be secured to the roll bar, in such embodiments, by one or more detents, one or more rods that pass through the standoff and/or the roll bar, or both. In some embodiments, the standoff may include one or more clips and/or straps that wrap around at least one of the one or more roll bars to secure the rear support bar to the roll bar. In some embodiments, the chassis may include one or more openings in the chassis disposed behind the passenger compartment. At least one of the one or more standoffs may fit into at least one of the openings. The standoff may have a shape, a size, or a shape and a size corresponding to a shape, a size, or a shape and a size of at least one of the one or more openings. For example, the opening may be circular, and the standoff may be cylindrical with an external diameter less than or equal to an internal diameter of the circular opening.

In some embodiments, the roof frame may further include a mid support bar. The mid support bar may be aligned transversely, or at least partially transversely, with the chassis, and may be disposed between the front support bar and the rear support bar. The mid support bar may be connected to the cross-bar. In some such embodiments, the overhead cover may detachably connect to the mid support bar. The overhead cover may rest on the mid support bar and the rear support bar in a closed position.

The cross-bar may serve one or more of several functions. For example, the cross-bar may provide longitudinal support for the roof between the front and rear support bars. The cross-bar may provide structural support for the hinges and/or the overhead covers. The cross-bar may act as a pivot point for the overhead covers; in some embodiments, the overhead covers may be connected to the cross-bar by a circular or tube joint. The joint may be fixed to the cross-bar and rotatably connected to the overhead cover, or may be fixed to the overhead cover and rotatably connected to the cross-bar. In some soft-top embodiments, one or more portions of the overhead cover may be wrapped around the cross-bar.

The cross-bar may be contiguous or segmented. The cross-bar may be integrally connected to one or more of the rear support bar, the mid support bar, and the front support bar, such as by being welded to such component. The cross-bar may be removably connected to one or more of the rear support bar, the mid support bar, and the front support bar, such as by one or more removable T-joints. For example, the cross-bar may include a first segment extending from the front support bar to the mid support bar, and a second segment extending from the mid support bar to the rear support bar. The cross bar may be welded to at least one of the front support bar, the mid support bar, and the rear support bar, and the cross-bar may be connected by a T-joint to at least one of the front support bar, the mid support bar, and the rear support bar. In one embodiment, the cross-bar is welded to the rear and mid support bars, and is connected to the front support bar by a T-joint. The T-joint may enable the roof frame to be disassembled and partially removed from the vehicle without removing the entire roof frame from the vehicle. For example, the front support bar may remain connected to the chassis as the rest of the roof frame is removed from the chassis. This may simplify the detachability of the roof. Despite this, the front support bar may be removable from the chassis, either with the rest of the roof frame, or separately. This may simplify installation and removal of the roof.

The front support bar may form a structure separate and distinct from the chassis. As such, means may be provided for removably connecting the front support bar to the chassis. The front support bar may include one or more ends that fit into the one or more openings in the chassis at the front of the passenger compartment. The one or more ends may have a shape, a size, or a shape and a size complementary to a shape, a size, or a shape and a size of the one or more openings. The ends may be secured in the openings in a variety of ways, such as by one or more detents in the ends or connected to the chassis in the openings. For example, in some embodiments, at least one of the one or more ends may include one or more detents that rest against an interior surface of the opening. The detents may prevent the end from being removed from the opening. In the same or other embodiments, the chassis may include hollow shafts within which the ends fit. The ends may be secured in the shafts by one or more rods passing through the ends and/or the shafts. The rods may include bolts or rods secured by linchpins, among other types. The rods may be disposed within the chassis and accessible through the speaker openings by removing the speakers. As described above regarding the chassis, the hollow shafts or openings may include stops. The ends may fit into the shafts or openings and rest against the stops. The front support bar may include stops disposed above the ends that limit how far the ends may be inserted into the chassis. Similarly, the standoffs of the rear support bar may include stops that limit how far the standoffs may be inserted into the chassis and/or the roll bars.

As described above, the front support bar may form a contour of the windshield and the chassis. The contouring may have several benefits over prior solutions, such as improved aerodynamics. The contouring may include a uniform distance between the front support bar and the windshield along the edge of the windshield extending between at least two windshield mounts that couple the windshield to the chassis, which may include at least a portion of the buffer zone. The contour may include a bend corresponding to the position on the chassis where the windshield mounts to the chassis. The contour may additionally include a uniform distance between the chassis and the front support bar between the windshield mount and the position on the chassis where the front support bar mounts to the chassis, which may include at least a portion of the buffer zone. Although described above and herein as contouring to the chassis, the front support bar may additionally or alternatively contour to a body panel secured to the chassis and/or covering the chassis.

Specific embodiments of the vehicles and roofs generally described above are depicted in the appended FIGs. and described below regarding the FIGs. The depicted embodiments are provided for convenience to aid in understanding the description provided above, and shall not be construed to limit the vehicles and roofs described above to the depicted embodiments.

Figure 1B:
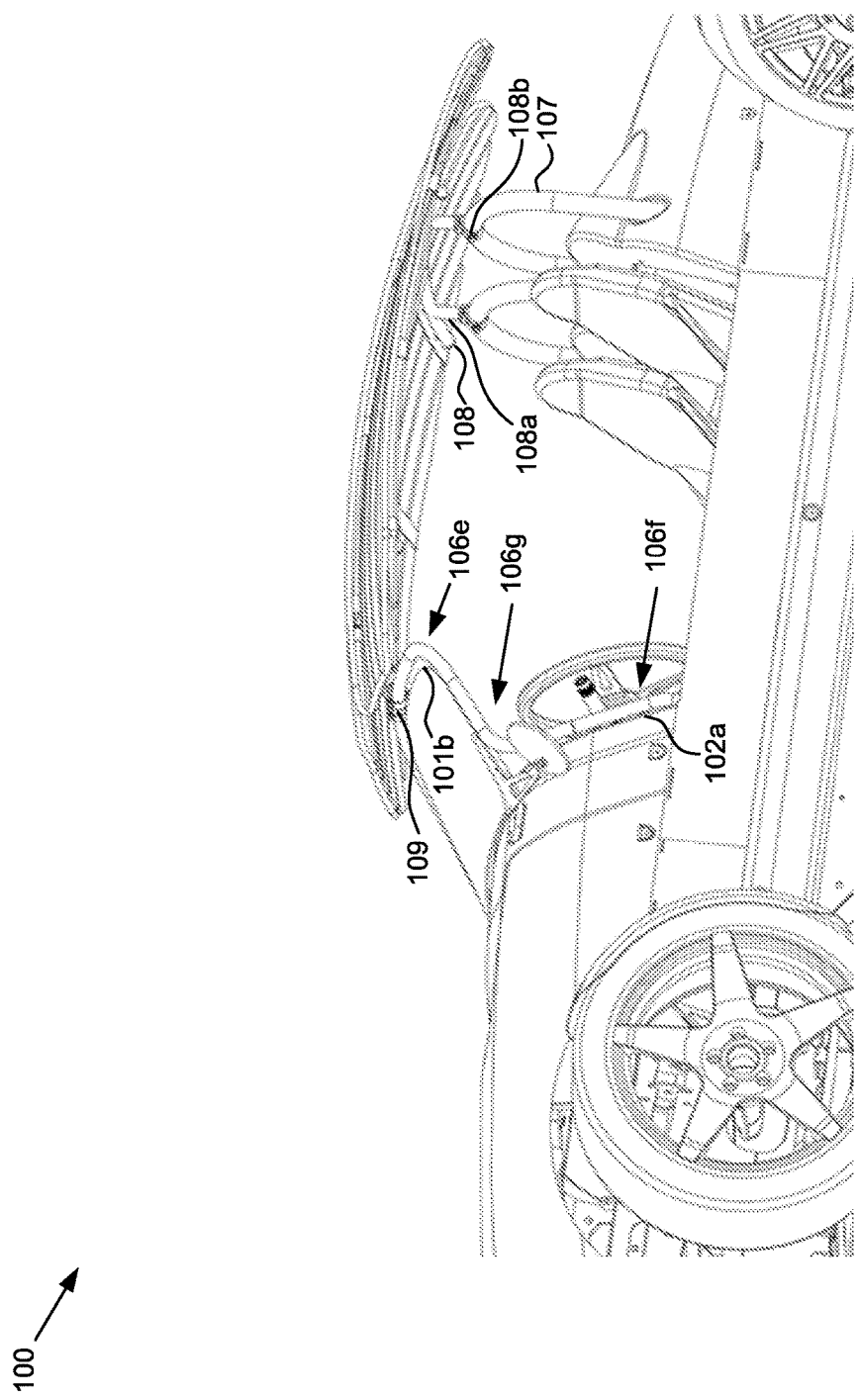

FIGS. 1A-B depict views of a three-wheeled vehicle with a detachable roof. FIG. 1A is an isometric view and FIG. 1B is a partial isometric view. The vehicle 100 includes a windshield 101, an exposed chassis 102, a body panel 103, a passenger compartment 104, an engine compartment 105, the detachable roof 106, roll bars 107, and a rear support bar 108. The windshield and body panel are fixed to the chassis by windshield mounts 101a. The roof includes a front support bar 106a, overhead covers 106b, hinges 106c, cross-bars 106d (one of which is not visible in the views provided, but which is shown in other FIGs.). The exposed portion of the chassis forms a partial side wall around the passenger compartment. The front support bar mounts to the chassis. The roll bars support the roof. The cross-bars connect the front support bar, a mid support bar (not shown), and the rear support bar. The rear support bar supports the roof on the roll bars by standoffs 108a, and is connected to the roll bars by clips 108b that wrap around the roll bars. The front support bar includes a contour 106e around a windshield edge 101b, a contour 106f along a chassis edge 102a, and a bend 106g corresponding to the windshield mounts and the position on the vehicle where the windshield mounts to the chassis. The cross-bars are connected to the front support bar by T-joints 109. A buffer zone 110 is disposed between the front support bar and the windshield and the front support bar and the frame. The buffer zone prevents the frame from vibrating against the windshield and/or the chassis.

Figure 2:
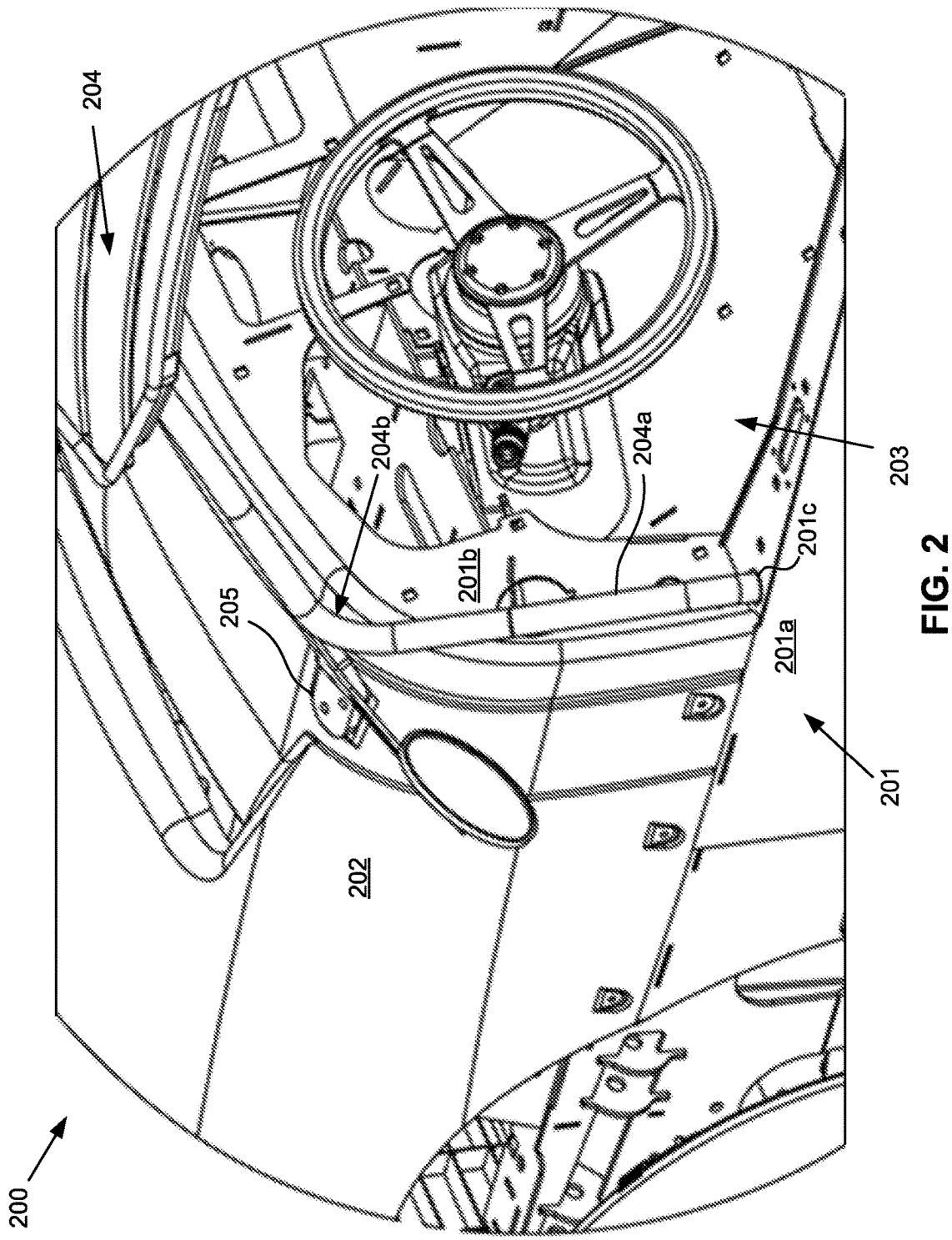
FIG. 2 depicts a zoomed-in view of a portion of a three-wheeled vehicle and a portion of a detachable roof.

FIG. 2 depicts a zoomed-in view of a portion of a three-wheeled vehicle and a portion of a detachable roof. The vehicle 200 includes a chassis 201, a body panel 202, a passenger compartment 203, a detachable roof 204, and a windshield mount 205. The chassis forms a partial wall 201a along a side of the passenger compartment and an instrument panel 201b. The detachable roof includes a front support bar 204a. The front support bar includes a bend 204b where the windshield mount fixes the body panel to the chassis. The front support bar contours to the instrument panel and inserts into an opening 201c in the partial wall formed by the chassis.

Figure 3:
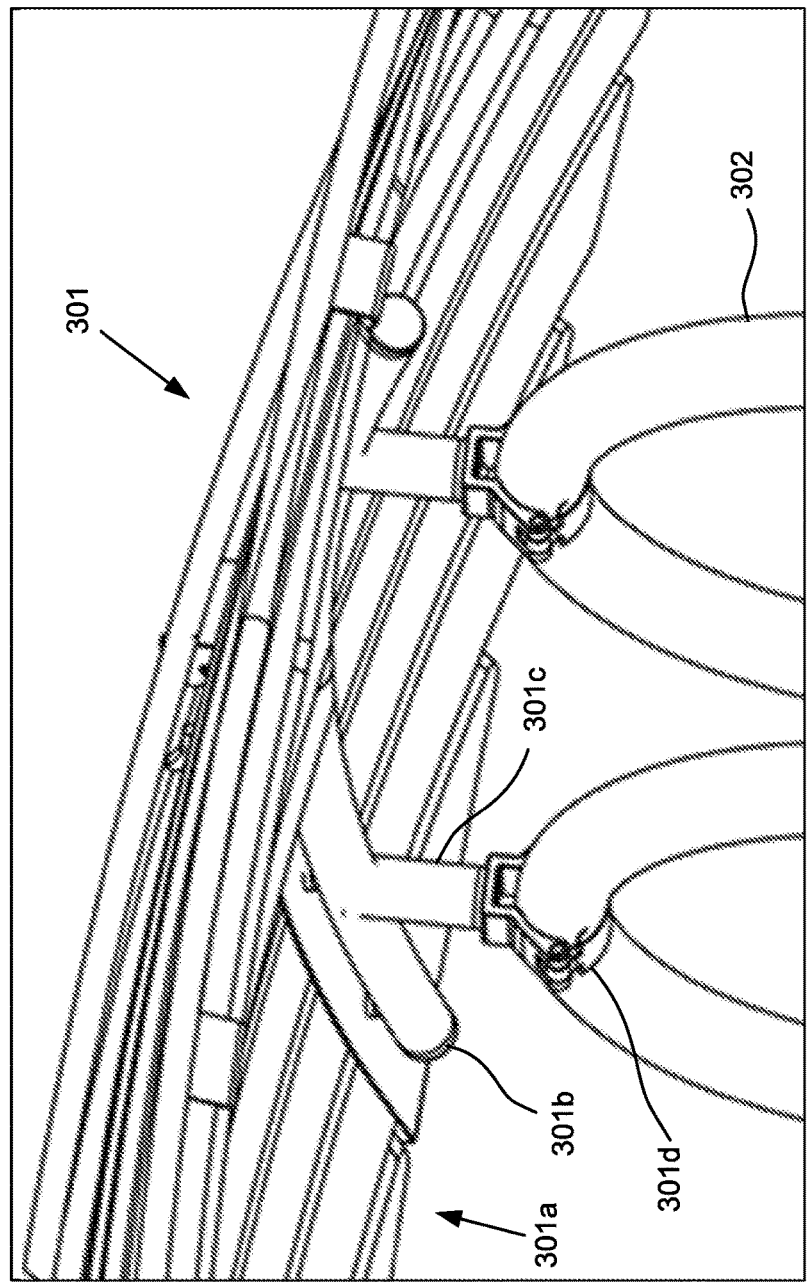
FIG. 3 depicts a zoomed-in view of a rear portion of a detachable roof connected to a vehicle.

FIG. 3 depicts a zoomed-in view of a rear portion of a detachable roof connected to a vehicle. The roof 301 is supported by roll bars 302. The roof includes overhead covers 301a, a rear support bar 301b, standoffs 301c, and clips 301d. The clips are connected to the standoffs and wrap around the roll bars to connect the roof to the roll bars.

Figure 4C:
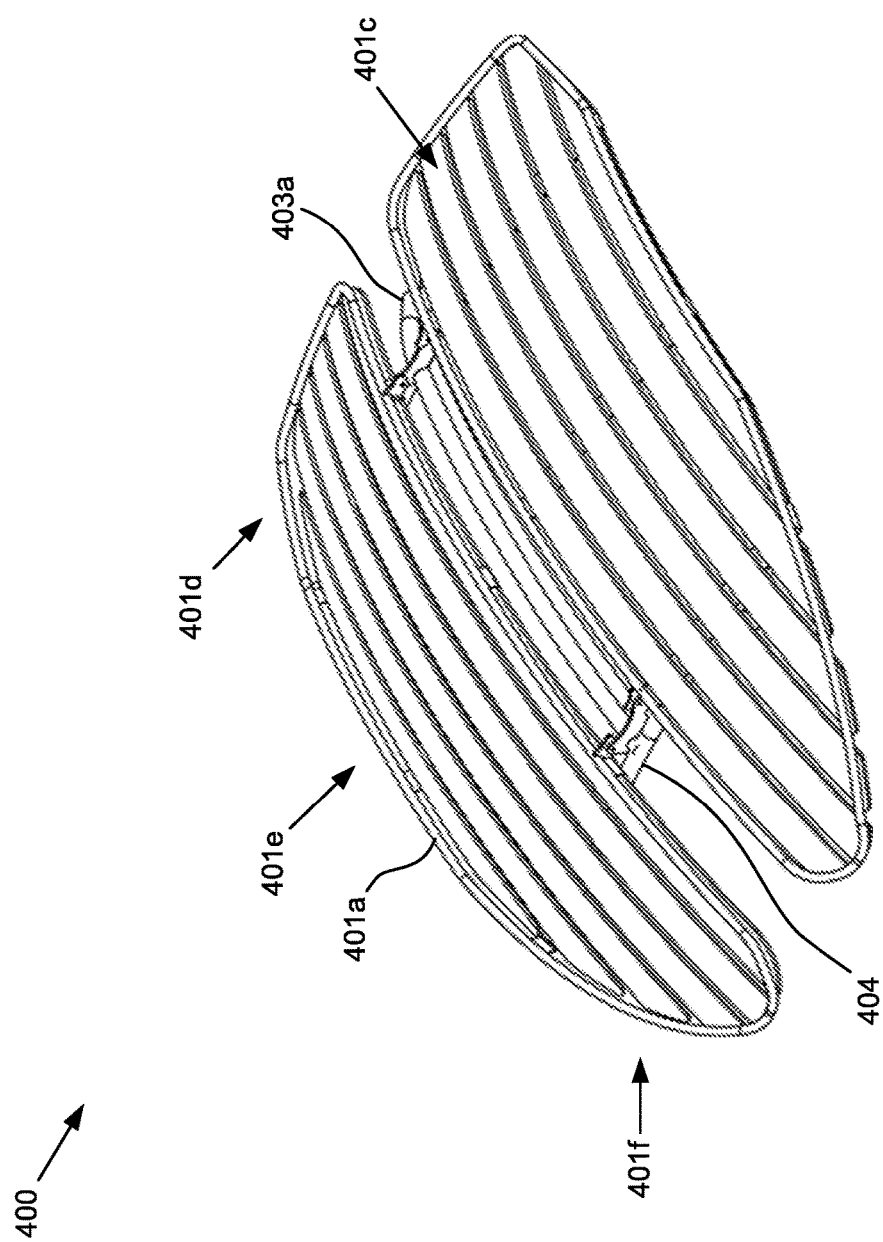

FIGS. 4A-C depict views of a portion of a detachable roof. FIG. 4A is a bottom view, FIG. 4B is a top view, and FIG. 4C is an isometric view. The roof 400 includes an overhead cover 401, a mid support bar 402, cross-bars 403, and a rear support bar 404. The overhead cover includes rods 401a forming closed-loops, cross-beams 401b connected to the closed-loop rods, and slats 401c supported by the cross-beams within the interior areas of the closed-loop rods. The overhead cover also includes three segments: a front segment 401d that has a forward-tapered width, a middle segment 401e that has a uniform width, and a rear segment 401f that has a rear-tapered width. The mid support bar includes cuts 402a that correspond to hooks that connect to the cross-beams at 401g. The cross-bars include two segments: a first segment 403a, and a second segment 403b. The second segment is welded to the mid support bar and the rear support bar. The first segment is welded to the mid support bar. The rear support bar includes standoffs 404a.

Figure 5A:
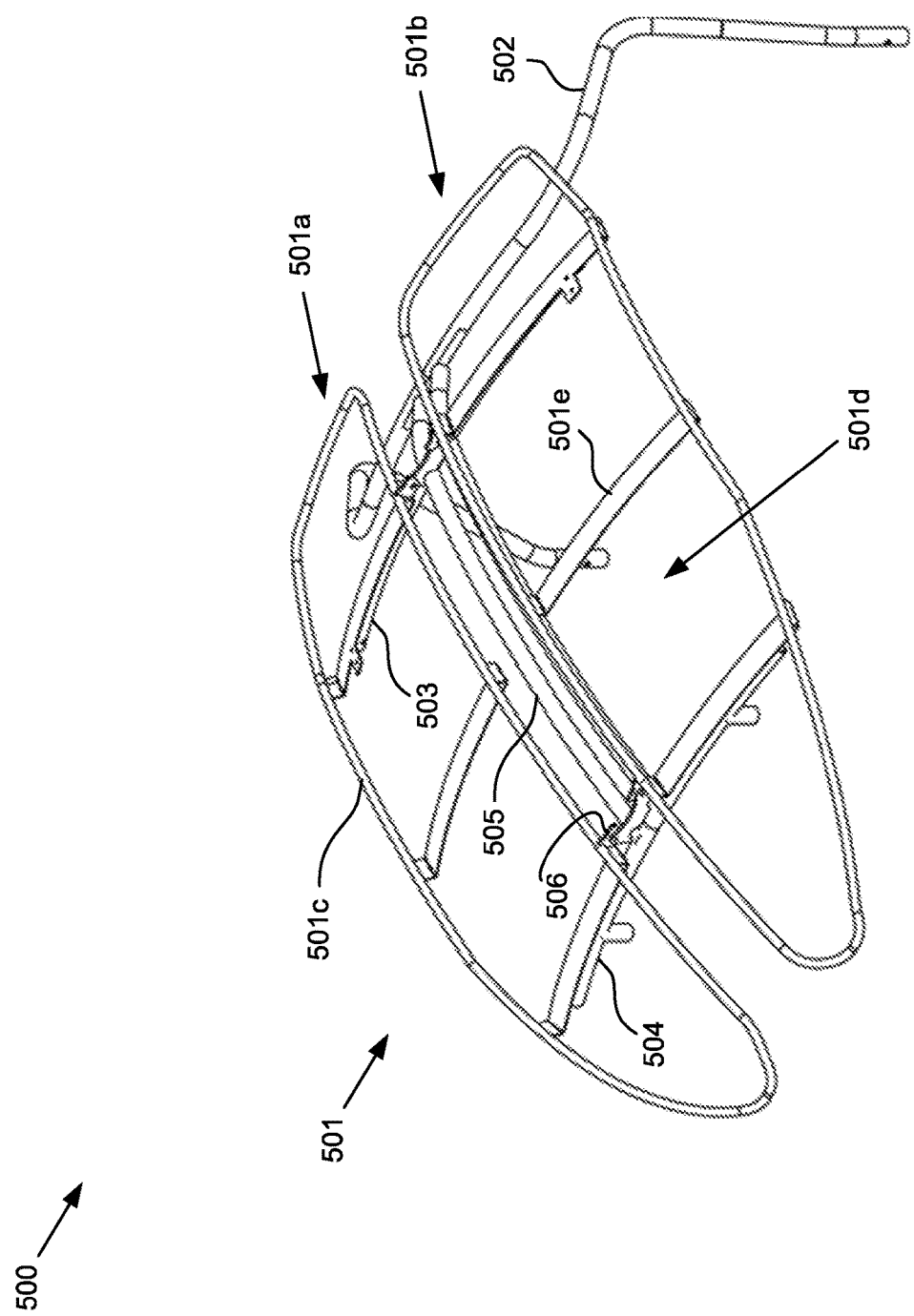
FIGS. 5A-C depict various views of a portion of a detachable roof.
Figure 5B:
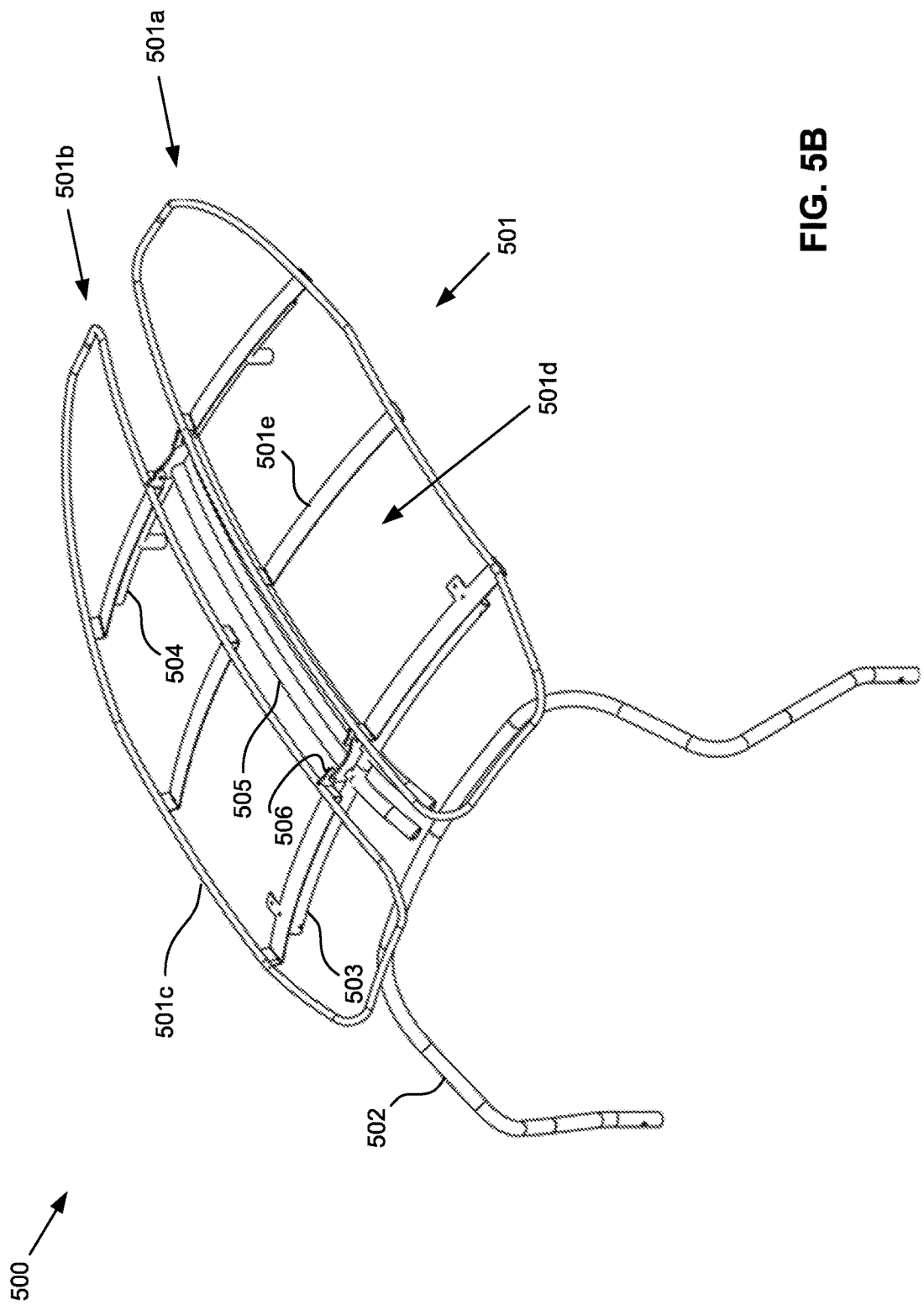
Figure 5C:
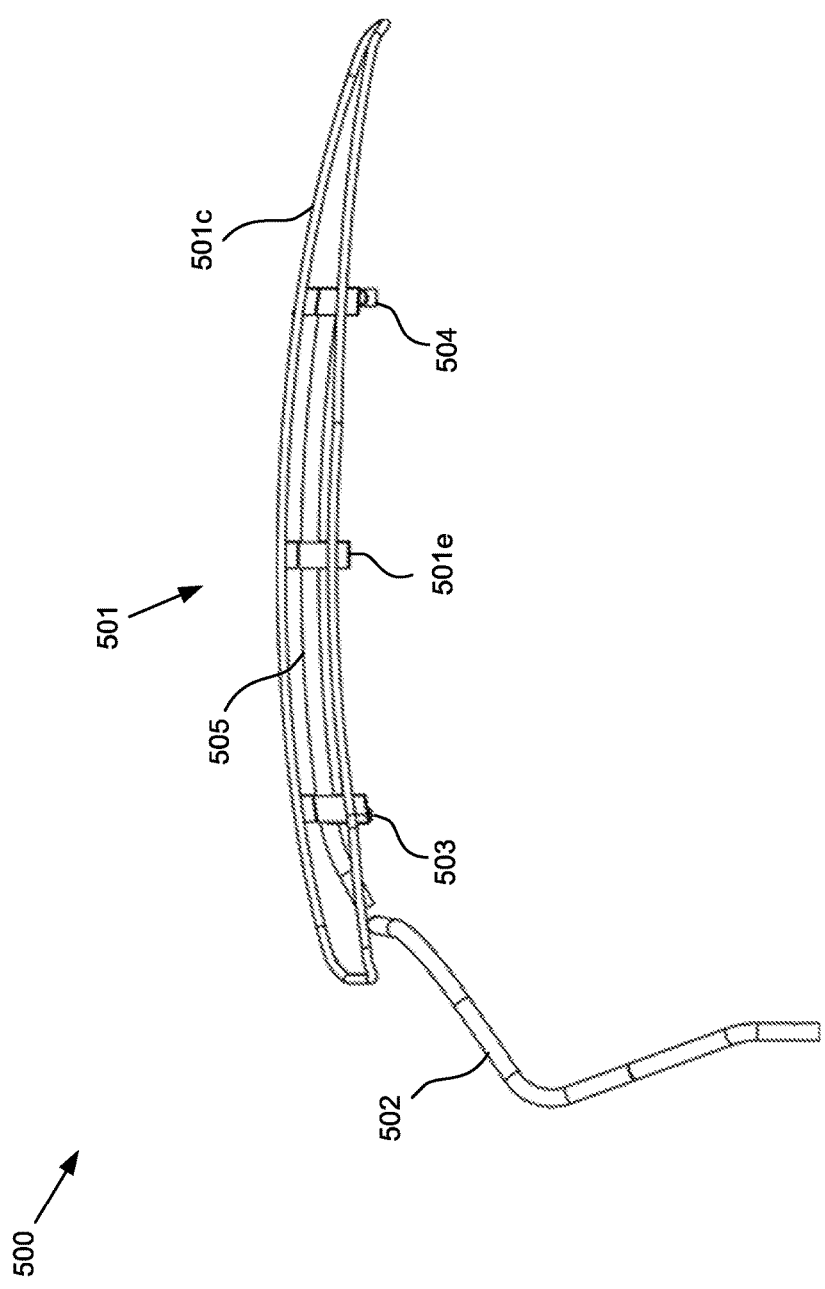

FIGS. 5A-C depict various views of a portion of a detachable roof. FIG. 5A is a rear-isometric view. FIG. 5B is a front-isometric view. FIG. 5C is a side view. The roof 500 includes an overhead cover 501, a front support bar 502, a mid support bar 503, a rear support bar 504, cross-bars 505, and hinges 506. The overhead cover includes a right-side cover 501a and a left-side cover 501b, rods 501c forming closed-loops, interior areas 501d, and cross-beams 501e extending across the interior areas and supporting the closed-loop rods. The cross-beams rest on the rear support bar and the mid support bar, and the closed-loop rods are connected to the cross-bars by the hinges. Not depicted are panels or slats that may be disposed in the interior areas and supported by the closed-loop rods and/or the cross-beams. Also not depicted are the T-joints depicted in FIG. 1A.

Figure 6:
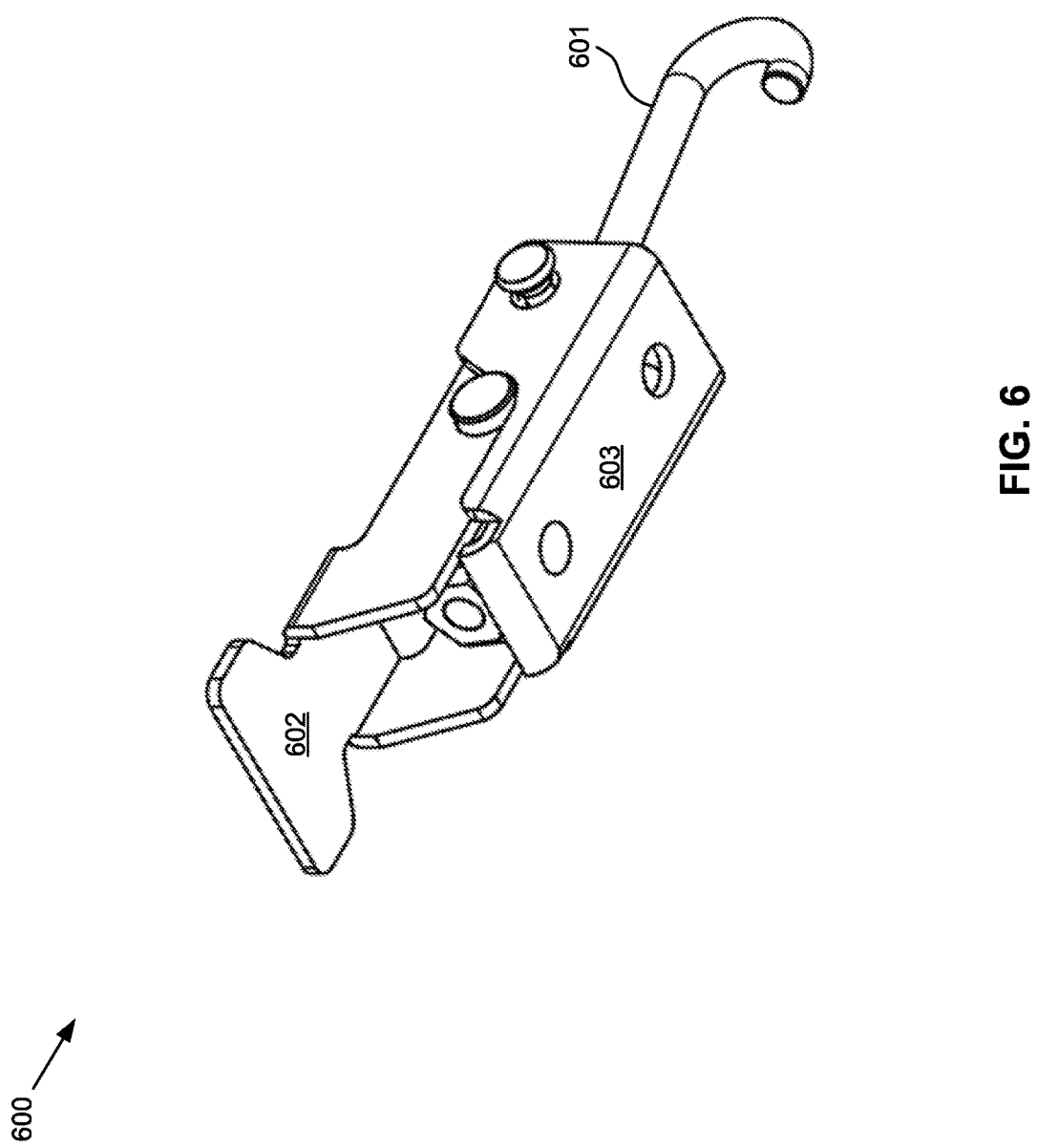
FIG. 6 depicts an isometric view of a clip that secures a rear support bar standoff to a roll bar.

FIG. 6 depicts an isometric view of a latch that secures an overhead cover to a support bar. The latch 600 includes a hook 601, a tab 602, and a mounting bracket 603. When the tab is in a closed position (such as is depicted), the hook is aligned parallel to the tab and pulled towards the tab. When the tab is in an opened position, the hook is pushed away from the tab and allowed to swing freely. The mounting brackets mount the latch to a surface, such as to a cross-beam of an overhead cover. The hook may pass along cuts in the support bar and pull against the support bar, securing the overhead cover to the support bar.

We claim:

1. A detachable vehicle roof, comprising:
   one or more overhead covers (106b/301a/401/501/501a/501b) covering a vehicle passenger compartment (104/203);
   one or more hinges (106c/506) connected to at least one of the one or more overhead covers; and
   the covers being detachable from a portion of a vehicle chassis (102/201) that forms the passenger compartment (104) and connected to at least one of the one or more hinges, the covers comprising:
      a rear support bar (108/301b/404) aligned transversely with the chassis;
      one or more cross-bars (106d/403/403a/403b/505) aligned longitudinally with the chassis;
      a front support bar (106a/502) at least partially transversely aligned with the chassis, at least one of the one or more cross-bars connecting the front support bar to the rear support bar,
      wherein the front support bar forms a contour (106e) adjacent an edge (101b) of a vehicle windshield (101) and an edge of the chassis (102a), the contour having a bend (106g) corresponding to a position on the chassis where the windshield mounts (101a/205) to the chassis; and
      a buffer zone (110) disposed between the front support bar and the windshield, between the front support bar and the chassis, or both, the buffer zone having a width ranging from one-fourth inch to six inches.

2. The detachable vehicle roof of claim 1, wherein the overhead cover comprises a subframe comprising a rod forming a closed loop (401a/501c), the closed-loop rod supported by one or more cross-beams (401b/501e) extending across an interior area (501d) of the closed-loop rod.

3. The detachable vehicle roof of claim 1, wherein the overhead cover comprises a subframe comprising a rod forming a closed-loop, the closed-loop rod supported by one or more cross-beams extending across an interior area of the closed-loop rod, and further comprising a plurality of slats (401c) supported within the interior area by the cross-beams.

4. The detachable vehicle roof of claim 1, wherein the overhead cover comprises a subframe comprising a rod forming a closed-loop, the closed-loop rod supported by one or more cross-beams extending across an interior area of the closed-loop rod, wherein at least one of the one or more cross-beams rests on the front support bar, the rear support bar, or both.

5. The detachable vehicle roof of claim 1, wherein the overhead cover comprises a subframe comprising a rod forming a closed loop, the closed-loop rod supported by one or more cross-beams extending across an interior area of the closed-loop rod.

6. The detachable vehicle roof of claim 1, wherein the front support bar mounts to the vehicle chassis, wherein the chassis comprises one or more openings (201c), and wherein the front support bar comprises one or more ends that fit into the one or more openings.

7. The detachable vehicle roof of claim 1, wherein the front support bar mounts to the vehicle chassis, wherein the chassis comprises one or more openings (201c), and wherein the front support bar comprises one or more ends that fit into the one or more openings, and wherein the one or more ends are secured in the one or more openings.

8. The detachable vehicle roof of claim 1, wherein the rear support bar is mounted on one or more roll bars (107/302).

9. The detachable vehicle roof of claim 1, wherein the rear support bar is mounted on one or more roll bars, wherein the rear support bar comprises one or more standoffs (108a/301c), wherein at least one of the one or more standoffs connects to clips (108b/301d) mounted on at least one of the one or more roll bars (302/107).

10. The detachable vehicle roof of claim 1, wherein the rear support bar is mounted on one or more roll bars, wherein the rear support bar comprises one or more standoffs (108a/301c), wherein at least one of the one or more standoffs comprises one or more clips (108b/301d) that wrap around at least one of the one or more roll bars.

11. The detachable vehicle roof of claim 1, wherein the vehicle chassis comprises at least one fixed partial wall (201a) along at least one side of the passenger compartment, wherein the front support bar mounts in the wall.

12. The detachable vehicle roof of claim 1, wherein at least one of the one or more overhead covers comprises three segments, a front segment (401d) comprising a forward-tapered width, a middle segment (401e) comprising a uniform width, and a rear segment (401f) comprising a rear-tapered width.

13. The detachable vehicle roof of claim 1, comprising a mid-support bar (402) disposed between the front support bar and the rear support bar and connected to the cross-bar, wherein the overhead cover detachably connects to the mid-support bar and rests on the mid-support bar and the rear support bar when in a closed position.

14. The detachable vehicle roof of claim 1, the cover comprising a mid-support bar disposed between the front support bar and the rear support bar and connected to the cross-bar, wherein the cross-bar comprises a first segment (403a) extending from the front support bar to the mid-support bar and a second segment (403b) extending from the mid-support bar to the rear support bar, wherein the cross-bar is welded to at least one of the front support bar, the mid support bar, and the rear support bar, and wherein the cross-bar is connected by a T-joint (109) to at least one of the front support bar, the mid-support bar, and the rear support bar.

15. The detachable vehicle roof of claim 1, wherein the buffer zone comprises a uniform width extending between at least two windshield mounts (101*a*) coupling the windshield to the chassis.

16. The detachable vehicle roof of claim 1, wherein at least one of the one or more hinges are connected to at least one of the one or more cross-bars.

\* \* \* \* \*